United States Patent
Nair et al.

(10) Patent No.: US 6,741,990 B2
(45) Date of Patent: May 25, 2004

(54) SYSTEM AND METHOD FOR EFFICIENT AND ADAPTIVE WEB ACCESSES FILTERING

(75) Inventors: Sandeep R Nair, Hillsboro, OR (US); Kingsum Chow, Hillsboro, OR (US); Ken T Deeter, Portland, OR (US); Brian C Tjaden, Seattle, WA (US)

(73) Assignee: Intel Corporation, Santa Clara, CA (US)

( * ) Notice: Subject to any disclaimer, the term of this patent is extended or adjusted under 35 U.S.C. 154(b) by 368 days.

(21) Appl. No.: 09/863,700

(22) Filed: May 23, 2001

(65) Prior Publication Data

US 2002/0178169 A1 Nov. 28, 2002

(51) Int. Cl.[7] ............................................... G06F 17/30
(52) U.S. Cl. ................... 707/9; 707/10; 707/2; 707/3; 709/203; 709/219; 709/229
(58) Field of Search .......................... 709/1–201, 203, 709/219, 229; 713/1–601; 707/7, 9, 2, 3, 10, 102

(56) References Cited

U.S. PATENT DOCUMENTS

| | | | | | |
|---|---|---|---|---|---|
| 3,964,029 | A | * | 6/1976 | Babb | 707/6 |
| 5,237,681 | A | * | 8/1993 | Kagan et al. | 707/104.1 |
| 6,014,733 | A | * | 1/2000 | Bennett | 711/216 |
| 6,321,267 | B1 | * | 11/2001 | Donaldson | 709/229 |
| 2001/0027412 | A1 | * | 10/2001 | Son | 705/14 |
| 2002/0040394 | A1 | * | 4/2002 | Shapira | 709/224 |
| 2002/0099936 | A1 | * | 7/2002 | Kou et al. | 713/151 |
| 2002/0123987 | A1 | * | 9/2002 | Cox | 707/3 |
| 2002/0165960 | A1 | * | 11/2002 | Chan | 709/225 |
| 2003/0046303 | A1 | * | 3/2003 | Chen et al. | 707/104.1 |

* cited by examiner

*Primary Examiner*—John Breene
*Assistant Examiner*—Kuen S. Lu
(74) *Attorney, Agent, or Firm*—Pillsbury Winthrop LLP (57) ABSTRACT

A system and method for filtering web accesses in an web access log analysis are described. A web log file having a plurality of entries, with each entry containing a field identifying a web access of a visitor, and a list of exclusion web accesses to be filtered from the web log file are provided. An optimum algorithm for searching in the list of exclusion web accesses is selected from a set of algorithms. Based on the selection, a data structure corresponding to the selected algorithm and the exclusion web accesses is built. Comparisons are made between the web access in each entry of the web log file and the data structure to filter or discount entries from the web log file.

23 Claims, 5 Drawing Sheets

Fields: date time c-ip cs-username s-sitename s-computername s-ip
1  cs-method cs-uri-stem cs-uri-query sc-status sc-win32-status sc-bytes cs-bytes time-taken s-port cs-version cs(User-Agent) cs(Cookie) cs(Referer)

2000-12-31 00:00:40 100.200.180.130 - W3SVC1 server1 140.200.180.140
2  GET /sites/channel/pix/toplogo.gif - 200 0 1099 162 0 80 HTTP/1.1
Mozilla/4.0+(compatible;+MSIE+4.01;+Windows+NT) 100010001 http://www.website.com 2000-12-31 00:00:50 100.28.163.80 - W3SVC1 server1 140.200.180.140
3  GET /sites/channel/pix/toplogo.gif - 200 0 1099 162 0 80 HTTP/1.1
Mozilla/4.0+(compatible;+MSIE+4.01;+Windows+NT) 100010002 http://www.website2.com 2000-12-31 00:01:06 100.28.163.80 - W3SVC1 server1 140.200.180.140
4  GET /Default.asp - 302 0 489 133 0 80 HTTP/1.1
Mozilla/4.0+(compatible;+MSIE+4.01;+Windows+NT) 100010002 http://www.website2.com

SYSTEM AND METHOD FOR EFFICIENT AND ADAPTIVE WEB ACCESSES FILTERING

BACKGROUND OF THE INVENTION

1. Field of the Invention

The present invention generally relates to the analysis and management of traffic data. More specifically, the present invention relates to a system, method and storage medium embodying computer-readable code for providing an efficient and adaptive web accesses filtering process for log analysis.

2. Discussion of the Related Art

Web sites have become one of the most important vehicles for one to reach out to a potentially worldwide audience today. Web servers interconnected via the Internet provide access to the public with minimal investment in time and resources in building a web site. The web sites make available for retrieval and posting valuable information. The information may be presented in a wide range of media and in a variety of formats, including audio, video and traditional text and graphics. Many of the web sites are also equipped with interactive mechanisms, allowing a user to interact with the web sites, such as on-line shopping. The ease of creating a web site makes reaching the worldwide audience a reality for all type of users, form corporations, to startup companies, to governmental agencies, to organizations and individuals.

Unlike other formats of media, such as television or radio, web sites are interactive and the web servers or an outside web site hosting service can passively gather access information about each user by observing and logging the traffic data packets exchanged between the web server and the user. Companies and organizations often employ outside web site hosting services to not only host their web sites and deal with complicated problems associated with the web sites, but to also generate web site analysis by observing the web access log of the web site. The web site analysis may, for example, develop detailed traffic statistics on a web site. The traffic statistics may include resources accessed, referrers, web server technical statistics and demographics information. Examples of resources accessed are statistical information related to most requested pages, most downloaded/uploaded files, most accessed directories, and paths users navigated through the web site. Examples of referrers are statistical information related to top referring sites/URL (Universal Resource Locator) and top search engines/keywords. Examples of web server technical statistics are statistical information related to server errors and client errors. Examples of demographics information are statistical information related to top geographic regions from which the web site is accessed, most active countries/organizations, and active states/cities/provinces.

The web site analysis may also generate reports with information on visitors and their behavior with respect to a web site. A visitor to a web site can be thought of as a person or a program that is accessing that web site. The visitor is identified either by the IP (Internet Protocol) address/domain name of a client machine or by a "cookie," which is a unique string that identifies each visitor. The information on visitors may include visitors by number of visits, new versus returning visitors, authenticated or unauthenticated visitors, and top visitor. The visitor's behavior with respect to a web site can be taken as how a user makes use of the web site. The behavior of a particular visitor may be identified from different statistics, such as the top paths taken, the top pages accessed, the top entry/exit pages from the web site, how many times the visitor returns at a later time, and how much time a visitor is spending on the web site.

The web site traffic analysis and visitors' information and behavior reports are important because they are often used to understand the effectiveness of a web site. However, there are difficulties associated with making the analysis and generating the reports in a timely fashion especially in light of the fact that the number of accesses by users, or traffic data packets exchanges between users and the web site, can be very large. A popular web site is likely to contain many servers, each serving millions of accesses per day. A web site analysis service is likely responsible for many popular web sites at a given time. As a result, dealing with the access logs from all the popular web sites may involve processing billions of accesses per day. Moreover, some accesses to the web site, such as those from automated agents, third party performance services and quality assurance checks, reduce the accuracy of the analysis and reports. Automated agents, such as spiders for search engines, are programs that traverse web sites automatically for html (hypertext markup language) validation, link validation, etc. Third party performance services, such as Keynote, generate web server performance statistics for a web site, e.g., how fast web servers of the web site respond to requests. While the accesses from automated agents, third party performance services, and the link, are logged in web log files in the same way as accesses from individuals, they do not reflect user behavior. Consequently, these accesses should not be included in reports intended to reflect user behavior.

There have been conventional web site traffic analysis systems that use web logs for performing analysis, but they generally have one or two shortcomings. Either they do not filter their web logs, in which case their analysis contains a lot of "dirty" data that reduce the accuracy of their reports/analysis, or else they use a simple filtering mechanism before analyzing their web logs. The simple filtering mechanism is usually a simple linear search that compares each logged web access with each exclusion access from a list of accesses to be filtered. The simple approach could work for cases where a small number of web logs are involved and where the filtering requirements do not vary a great deal. However, as discussed, the volume of accesses or logs to be analyzed by a web site analysis service responsible for a number of web servers is quite large and the set of accesses or logs to be filtered often vary between web servers. The simple filtering mechanism does not scale to allow processing of a large amount of data in a timely fashion and is not adaptive. As a result, it no longer suffices. Therefore, there is a need for a system and method that provides an efficient and adaptive IP address filtering process for log analysis.

BRIEF DESCRIPTION OF THE DRAWINGS

The accompanying drawings, which are incorporated in and form a part of this specification, illustrate embodiments of the present invention and, together with the description, serve to explain the principles of the present invention.

DETAILED DESCRIPTION

Reference will now be made in detail to the preferred embodiments of the invention, examples of which are illustrated in the accompanying drawings. While the present invention will be described in conjunction with the preferred embodiments, it will be understood that they are not intended to limit the invention to these embodiments. On the contrary, the present invention is intended to cover alternatives, modifications and equivalents, which may be included within the spirit and scope of the invention as defined by the appended claims. Moreover, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components and circuits have not been described in detail as not to unnecessarily obscure aspects of the present invention.

Figure 1:
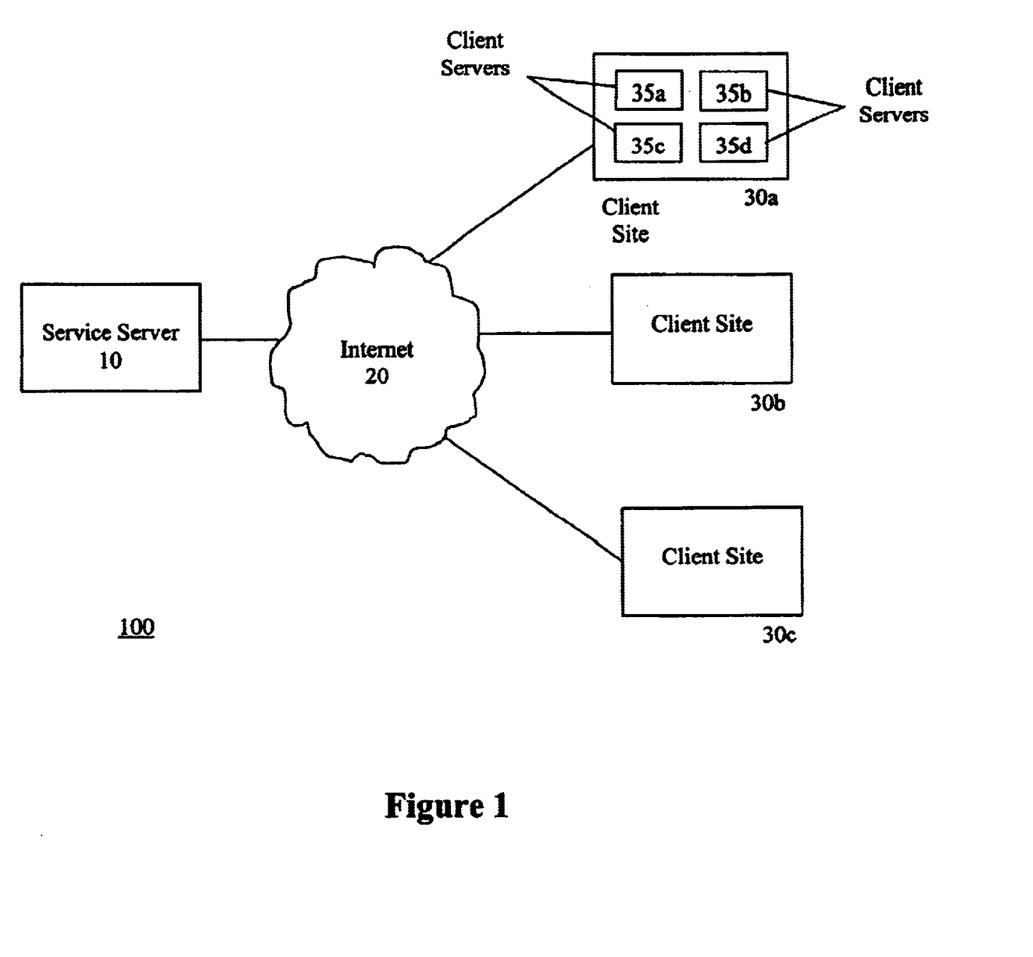
FIG. 1 illustrates a web site analysis system, having a service server connected to a client site via the Internet, in which embodiments of the present invention may function.

Embodiments of the present invention are directed to systems, methods and storage media embodying computer-readable codes for providing an efficient and adaptive web accesses filtering process for log analysis. FIG. 1 shows a web site analysis system in which embodiments of the present invention may function. The web site analysis system 100 includes a service server 10 connected to a number of client sites 30a–30c via the Internet 20. The service server 10 offers web site analysis to the client sites 30a–30c, developing detailed traffic statistics on access information to the client sites 30a–30c and generating reports about visitors to the client sites 30a–30c and the behavior of such visitors. It is also noted that although the service server 10 is shown as one server in FIG. 1, the service server 10 may be composed of a group of servers.

Each of the client sites has at least one web site (not shown) that allows visitors to interact with the client site. The web site(s) is likely to contain a number of different web pages, links, files, directories interconnected and linked together, allowing visitors to navigate through, interact with, download from, upload to and gain access to the web site. Each of the client sites may, for example, contain many client servers. For example, the client site 30a is shown to include four client servers 35a–35d. Each of the client servers 35a–35d would serve millions of accesses of the visitors per day. The number of accesses is certainly to increase with the advance in technology, and a server is likely to be handling billions of hits/accesses per day in the future. A visitor as referred herein is a person or a program that is accessing the web site(s) and/or web server(s) at a client site. A visitor is identified, for example, by the IP address/domain name of the machine from which the visitor is visiting or by a cookie that identifies the visitor. At the client sites 30a–30c, preferably the client servers 35a–35d, the accesses of the visitors and information relating to the accesses are logged and stored in web log files. It is noted that although three client sites 30a–30c, with the client site 30a containing four client servers 35a–35d, are shown in FIG. 1, the number of client sites served by the service server 10 and the number of client servers within a client site are arbitrary.

In analyzing the client sites 30a–30c, the service server 10 eliminates or discounts accesses that reduce accuracy of the traffic statistics and the reports by providing an efficient and adaptive method for filtering a specified set of the accesses to each of the client sites 30a–30c from their corresponding web log files. It is noted that the word "filtering" as used herein encompasses the meaning of eliminating or discounting. In one embodiment, the service server 10 removes these accesses before the web log files are analyzed. In another embodiment, the service server 10 discounts information related to these accesses during filtering or when performing analysis. Efficiency is required because the number of accesses to be processed is oftentimes very large. As mentioned before, each of the client sites 30a–30c may include many client servers, each serving an enormous number of accesses per day. As a result, filtering sets of specified accesses from a service server 10 responsible for many client sites may involve processing billions of accesses per day. In addition, the present method must be adaptive because the set of accesses to be filtered can vary between client sites. The set of accesses to be filtered varies for several reasons, including different performance analysis being carried out on different client sites, different filtering requirements being prescribed by different client sites, and different accesses being the result of a change over time. The set of accesses to be filtered may also vary between client servers within a particular client site. This is especially true where the particular client site employs different client servers to obtain different information from visitors' accesses and/or carry out different functions, making the set of accesses to be filtered different for the different client servers within a client site.

According to an embodiment of the present invention, the service server 10 gathers, on a scheduled interval, web log files, or web logs, from the client sites 30a–30c, preferably from the client servers within each of the client sites 30a–30c. The web log files, or the pertinent portion of the web log files, are sent from the client sites 30a–30c to the service server 10 via the Internet, preferably using a secured connection to prevent unauthorized user from eavesdropping or gaining access to the information contained in the web log files. The web log files may, for example, be HTTP web log files. Each client site and/or client server information and filtering requirements are specified in configuration files, which may be entered at the service server 10, sent to the service server 10 prior to sending the web log files, or sent to the service server 10 along with the web log files. The service server 10, which gathers the web log files, reads the set of accesses to be filtered from the configuration files. Since HTTP web log files are employed in the embodiment, the set of accesses to be filtered is based on IP addresses. In other embodiments, other type of web log files, or web log files with different format, and a different format of the set of accesses to be filtered may be used. After reading the set of IP addresses to be filtered from a configuration file of a client site or a client server, metrics are generated for each algorithm based on the specifics of the set of IP addresses. The algorithm is used to search whether a candidate IP address is to be excluded. For example, the metrics may depend on whether the set of IP addresses contains individual IP addresses or blocks of IP addresses, and what is the portion of the individual IP addresses versus that of the blocks of IP addresses. The best algorithm is then chosen, which may be based on previously generated performance data for each metric. The process is performed repeatedly for each web log file associated with a different configuration file or a different set of IP addresses to be filtered. Each web log file is then filtered using its corresponding chosen algorithm. The filtered web log files are then passed to another server, such as a reporting server, for the generation of traffic reports for the client sites or the client servers associated with the web log files.

Figure 2:
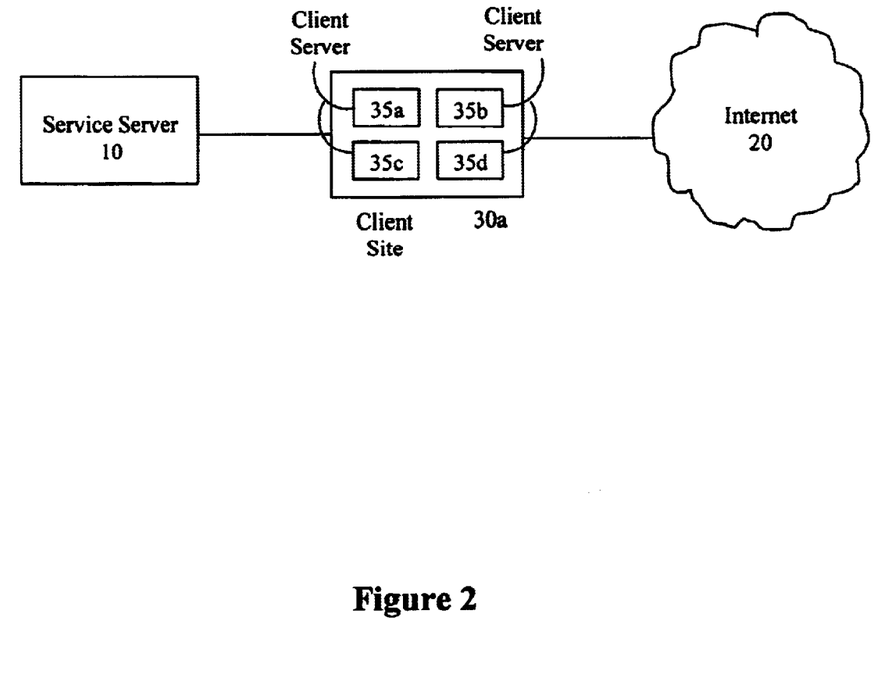
FIG. 2 illustrates a web site analysis system, having a service server connected to a client site that connects to the Internet, in which embodiments of the present invention may function.

With reference now to FIG. 2, another implementation of a web site analysis system in which embodiments of the present invention may function is illustrated. In this implementation, instead of having a service server connected to a client site via the Internet, there is a direct connection between the service server 10 and the client site 30a. The service server 10 may even reside at the client sites 30a, with the client servers 35a–35d or in one of the client servers 35a–35d, to carry out the efficient and adaptive filtering. The client sites 30a in turn connects to the Internet so that visitors may navigate through, interact with, download from, upload to and gain access to a web site(s) or server(s) at the client sites 30a–30c. The service server 10 may also reside at a remote location. However, instead of using the Internet to send web log files, or pertinent portions within the web log files, and configuration files from the client site 30a, or the client servers 35a–35d, to the service server 10, other types of connection are utilized. For example, a secured dedicated connection or wireless connection may be employed.

Figure 3:
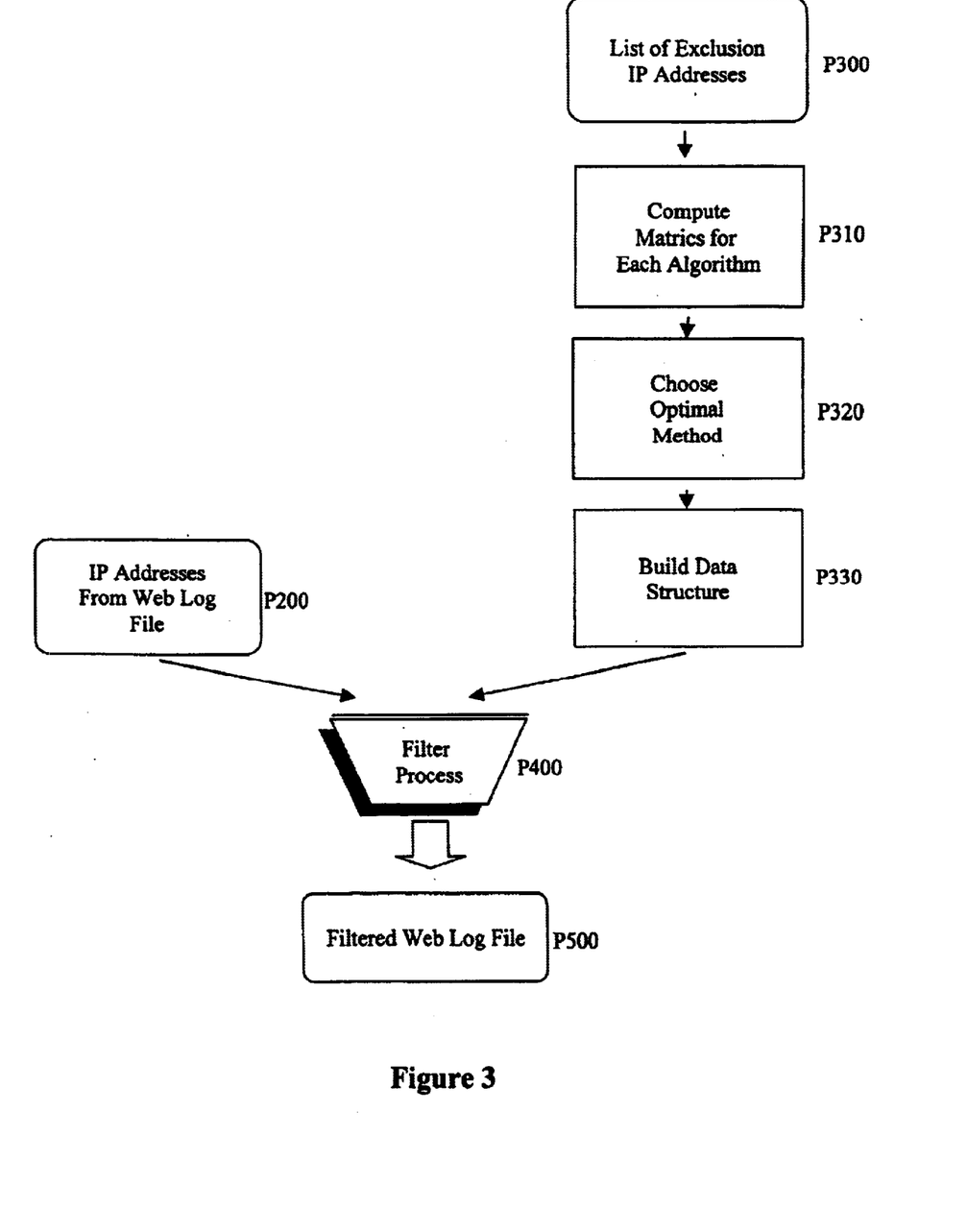
FIG. 3 shows an efficient and adaptive web log filtering process according to an embodiment of the present invention.
Figure 4:
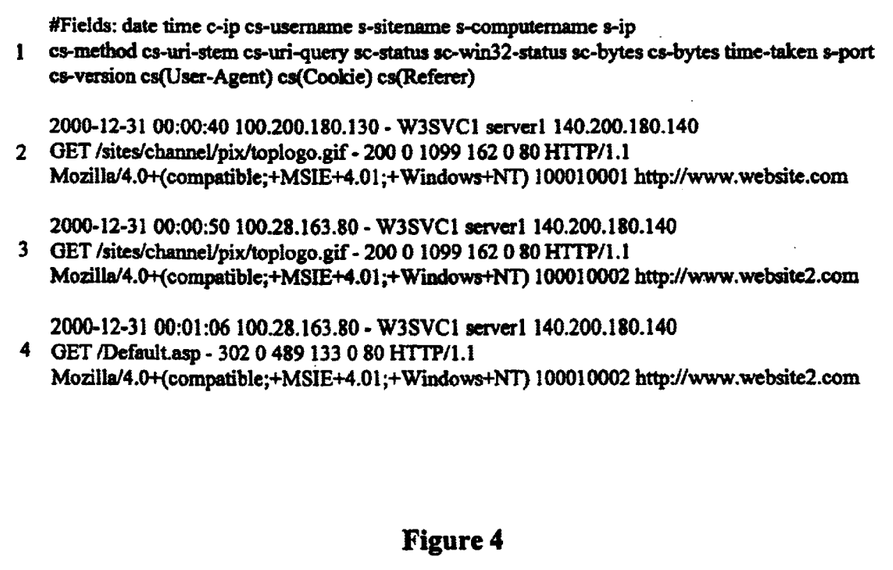
FIG. 4 shows an illustrative example of a web log file analyzed by embodiments of the present invention.

FIG. 3 shows an efficient and adaptive web accesses filtering process in accordance with an embodiment of the present invention. As an illustrative example, an efficient and adaptive IP address based filtering of an HTTP web log file of a client web server, or web logs contained in the web log file, is described below. In this illustrative example, web accesses are IP addresses from a web log file associated with the client web server. The IP addresses identify visitors accessing the client web server and are associated with information pertaining to the accesses. As shown in block P200, the service server 10 is provided with a web log file associated with a client web server whose web log file the service server 10 is to process. The service server 10 eliminates entries from the web log file that include specific exclusion IP addresses. FIG. 4 shows an illustrative example of a portion of a web log file analyzed by embodiments of the present invention. In this implementation, the web log file contains several fields, which are shown in line 1 of the web log file. The fields include those for the client IP address (c-ip), server IP address (s-ip), date and time access (date; time), the number of bytes transferred (sc-bytes; cs-bytes), the user agent (cs(User-Agent)), the referrer(cs(Referrer), and the cookie (cs(Cookie)) to identify the user. Lines 2–4 represent entries in the web log file, each entry containing IP address and access information associated with the IP address entry. For example, line 2 represents an entry by a visitor, with a client IP address of 100.200.180.130, accessing the client web server on Dec. 12, 2000 at 00:00:40. Other access information associated with the entry in line 2 is stored in the other fields. For entries by the same visitor, the client IP address field and the cookie field of the entries is going to be the same. This is shown by entries in line 3 and line 4, which show access information by a visitor with a client IP address of 100.28.163.80 on two separate occasions. Based on the IP address field and other fields, the service server 10 is able to track the pages that a visitor has accessed and how long the user is staying in the client web server. This allows visitor behavior to be generated. It is noted that the format of this web log file and the fields therein are presented as merely an example. The format may vary from one type of a client web server to another type, with different fields, different number of fields and/or different order in the fields.

In addition to the IP addresses from the web log file of the client web server, the service server 10 is also provided with a set of IP addresses to be filtered from a configuration file associated with the client web server, as shown in block P300 in FIG. 3. The set of IP addresses for filtering is hereinafter referred to as "the list of exclusion IP addresses." The list of exclusion IP addresses may be specified in two ways. First, it may be specified as individual IP addresses, e.g., 143.141.181.196. Second, it may be specified as blocks of IP addresses, e.g., 143.141.181.128–143.141.181.150. In one implementation, the list of exclusion IP addresses is determined by each client served by the service server 10, for a specific client site or client web server, and specified in a configuration file. For example, a client may want to exclude certain activities recorded in the web log files from traffic and behavior reports due to specific reasons, such as internal hits (or accesses) from the client's own company or affiliates, hits from web site monitoring servers and hits from hosting company servers. In another implementation, the service server 10 may extract other information from the configuration file, such as filtering requirements stating what type of accesses is to be eliminated without giving specific IP addresses. For example, the filtering requirements may be used to generate the list of exclusion IP addresses using pre-stored data and/or information previously learned from previous filtering sessions.

Given the list of exclusion IP addresses to filter, an optimum algorithm needs to be selected for searching in the list of exclusion IP addresses for matches. As mentioned previously, the list of accesses to be filtered, or the list of exclusion IP address in this case, often varies from one client web server to another because of different performance analysis or different filtering requirements exist at different client web servers. For example, each client may decide to filter activities coming from its own company, so the list of exclusion IP address in each case is different. To reduce the cost of identifying whether a particular IP address in the web log file is to be ignored, the adaptive process explores the performance of several different algorithms and data structures. In block P310, metrics are generated for each algorithm to calculate the effectiveness of the algorithm for the list of exclusion IP address. The algorithms is chosen from any number of predefined methods, including, but not limited to, binary search, multi-level dynamic table indexing, adaptive hashing, and bit pattern based exclusion.

The interaction of these algorithms with the IP addresses from the web log file (block P200) will be explained in more detail later, as the discussion now centers on computing the metrics for each algorithm. In one implementation, the metrics to be used to identify the optimum algorithm for a list of exclusion IP addresses are the number of exclusion IP addresses to be filtered and the number of unique combinations to be filtered. For example, binary search algorithm is often employed if there is a relative small number of individual exclusion IP addresses to filter. However, binary search algorithm is probably not the best algorithm if you have blocks of IP addresses to filter. In case of binary search, the number of exclusion IP addresses to filter may be one of the determinative metrics, and as the number grows the performance decreases.

Multi-level dynamic table indexing algorithm is suitable when there are blocks of IP addresses to filter. The metric in this case would be the number of unique combinations of octets in the list of exclusion IP addresses, assuming that eight bits are used for indexing. The number of unique combinations implies the size of the search space and the performance of the method using this algorithm. The unique combinations to look for need not be of octets, as it is determined by the number of bits used for indexing, which may also be determined from the list of exclusion IP address.

As an illustrative example, if a block of IP addresses from X.Y.Z.0 to X.Y.Z.255 were to be filtered using the binary search algorithm, there would be 256 entries added to the list of exclusion IP addresses. In order to find whether an IP address from the web log file is in the list of exclusion IP addresses, the list may need to be broken into half several times. In some case, up to nine comparisons are needed using the binary search algorithm. However, in the case of the multi-level dynamic table indexing algorithm, the result of whether an IP address from the web log file is to be excluded is always found in three comparisons. On the other hand, if several distinct IP addresses to filter, such as X.Y.Z.A and X.Y.Z.B, were to be filtered using the multi-level dynamic table indexing algorithm, then at least four comparisons are needed to be performed before we know whether an IP address from the web log file needs to be excluded. On average, the same result is achieved with fewer comparisons using the binary search algorithm in this case.

Each algorithm has its performance tradeoffs, and the effectiveness of each is evaluated using metrics generated for each algorithm based on the set of exclusion IP addresses and performance data from previous analysis run. The performance data may, for example, be the filtering time of a set of exclusion IP addresses that has a similar metrics as the one to be analyzed. In block P330, the optimal method/algorithm is chosen to filter the list of exclusion IP addresses. Performance data for various metrics can be collected from the feedback data of previous analysis runs where the same or similar metrics are used. By default, the service server 10 may have pre-stored performance data or parameters that is the result of test runs. The parameters may, for example, specify which algorithm is to be used based on the metrics for each algorithm derived from the list of exclusion IP addresses. If it is determined that the list of exclusion IP address is small, then the parameter would likely direct that the binary search algorithm is to be used. If it is determined that there are many unique combinations, then the parameter would likely direct that the multi-level dynamic table indexing algorithm is to be used. For general algorithms like the binary search algorithm, the performance data for various metrics can also be obtained from previous statistical analysis. Once the metric for each algorithm for a set of IP address is figured out, the previously generated performance data is used to decide which algorithm is better for the current use. As more and more sets of exclusion IP addresses and their metrics are analyzed by the service server 10 with respect to each algorithm, more and more feedback data that more accurately predict which algorithm yields better performance is available.

Once the optimum algorithm/method is chosen, the corresponding data structure for the optimum structure is built, and a standard interface to the functionality of the chosen method is created. In block P330, a data structure corresponding to the optimum algorithm is built. For the binary search algorithm, the data structure is a sorted list of exclusion IP address. For the multi-level dynamic table indexing algorithm, the data structure is a multi-level table. In one implementation, the standard interface comes within a filter process to be described later. In one implementation, the interface is standardized via a C function pointer or an abstract C++ wrapper class since each data structure for the algorithm is designed with a fixed input and a fixed output. The fixed input is an IP address, and the fixed output is either "yes" or "no."

After the desired data structure is built, the IP addresses from the web log file is subjected to filtering by the data structure in a filtering process, as shown in block P400 of FIG. 3. The filtering process uses the data structure to determine whether each IP addresses from the web log file should be included or excluded for web usage analysis. For example, if binary search algorithm is chosen, each of the IP addresses from the web log file is compared with the binary search data structure formed in block P330. The binary search data structure is a sorted list of exclusion IP addresses. The comparison starts by looking at the middle element of the sorted list. If there is a match between this element and a particular IP address from the web log file, the entry in the web log file associated with the particular IP address is either eliminated or not taking into account when web analysis is performed. Otherwise, this process is continue in the lower half of the list if the middle element is lower than the particular IP address or the upper half of the list if the middle element is higher. Thus, the sorted list of exclusion IP addresses is narrowed down to half on each comparison, which gives better overall performance during searching.

Figure 5:
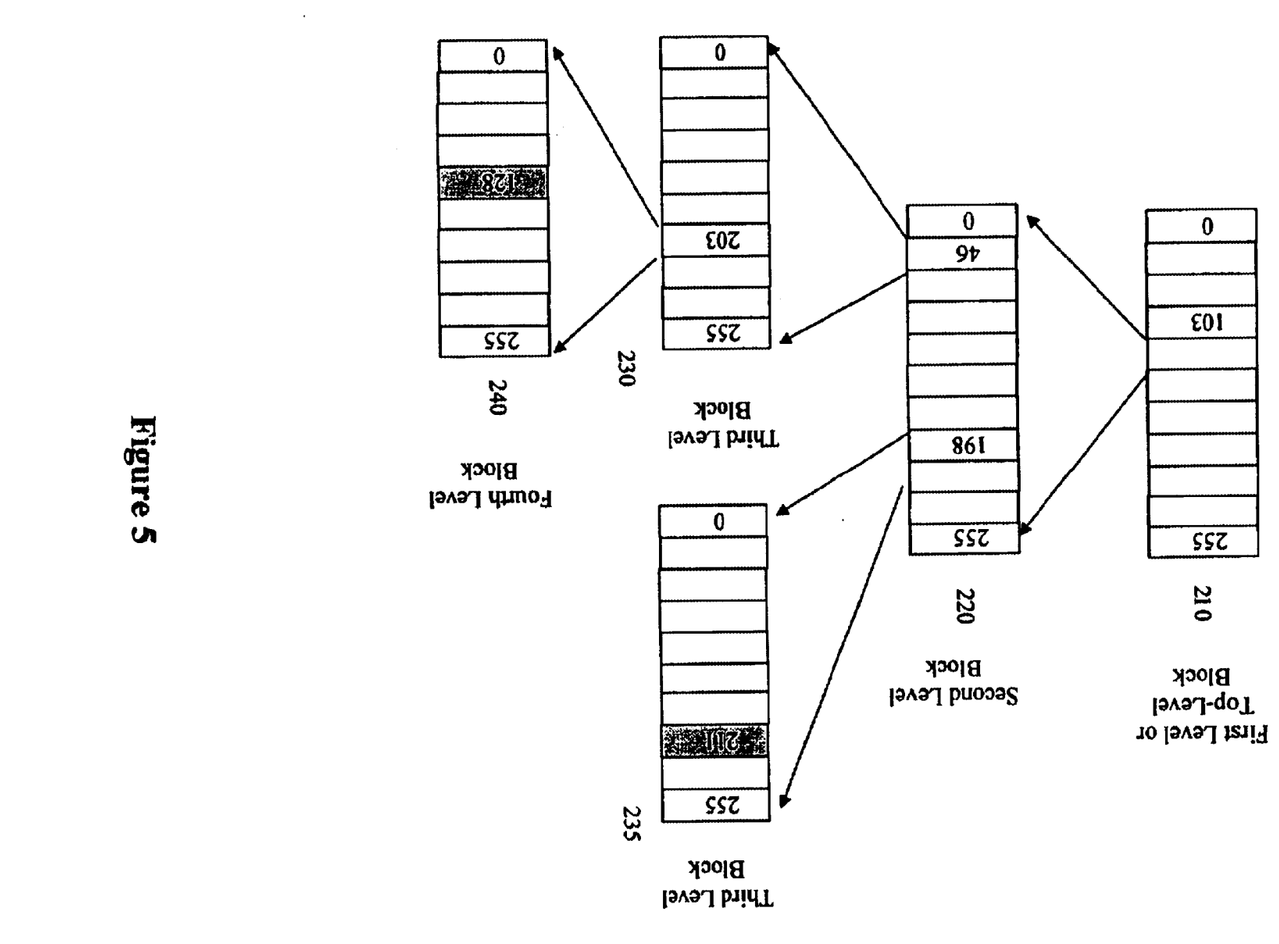
FIG. 5 shows an illustrative example of a multi-level table data structure according to an embodiment of the present invention.

If multi-level dynamic table indexing is chosen, each of the IP addresses from the web log file is compared with the multi-level table data structure formed in block P330. To reduce the cost of identifying whether a particular IP address from the web log file falls into the set of exclusion IP addresses, a multi-level table is employed. FIG. 5 shows an illustrative example of a multi-level table data structure for searching whether an IP address is in the list of exclusion IP addresses according to an embodiment of the present invention. In the example, 8 bits, up to 256, are used to index the table with four levels, and IP address 103.46.203.128 and the block of IP addresses 103.198.211.0–103.198.211.255 are marked for exclusion. Each block in the table is a table of single array with 256 elements. Block 210 represents the first 8 bits of an IP address, block 220 represents the second 8 bits of an element 103 of an IP address and block 230 represents the third 8 bits of an element 46 in the second 8 bits of the element 103 of an IP address. For clarity purpose, the 256 elements are represented by only eleven columns in each of the blocks 210–240. In one implementation, each element contains a pointer optionally pointing to the next level block and a flag indicating if the element is in the set of "exclusion" IP addresses. For example, the IP address represented by element 128, 103.46.203.128, in block 240 is in the set of exclusion IP addresses, and the IP addresses represented by element 211 in block 235, 103.198.211.0 through 103.198.211.255, are also in the set of exclusion IP addresses. The flag may be set at "1" for exclusion and "0" for no exclusion.

To check whether a candidate IP address is in the multi-level table, the highest 8 bits, or the first octet, in the candidate IP address is observed and indexed into the top level block 210 of the table for the corresponding element. If the exclusion flag for that element is set, then all IP addresses starting with the given 8 bits are in the list of exclusion IP addresses and we exclude or discount the candidate IP. If the exclusion flag is not set and the pointer is NULL, then the candidate IP is not in the table, which means it is not in the list of exclusion IP addresses. If the exclusion flag is not set and the pointer is not NULL, indicating that the pointer is pointing to the next level block, then the process is repeated using the next octet as an index into the second-level block. For example, if the first octet is 103, then the process is repeated using the second-level block 220. With this approach and with IP addresses being 32 bits and represented by four octets, there is at most a four-level structure to represent all the exclusion IP addresses. In the majority of cases, most of the elements in the top-level block 210 have their flags not set and their pointers NULL. This means, the determination can be made after checking only the top-level block 210. In the worse case scenario, only four levels of blocks are needed to be checked to determine if a candidate IP is in the table. Only IP addresses that are very similar to those specified in the list of exclusion IP addresses would require extra checking of the multiple levels.

In block P500, after the filtering process, a filtered web log file is obtained. In one implementation, the filtered web log file is passed to another server, such as a reporting server, that is responsible for generating traffic and visitor behavior reports. In another implementation, other information associated with an IP address in an entry is extracted from the entries of the web log file with non-filtered IP addresses during the filtering, from which the traffic and visitor behavior reports are generated.

According to an embodiment of the present invention, the IP addresses from web log file are processed before being subjected to the filtering process in block P400. Entries in the web log file are sorted on the basis of their corresponding IP addresses, creating an IP address sorted web log file. After the IP address of an entry from the IP address sorted web log file is compared with an exclusion IP address in the specific data structure, the next entry from the IP address sorted web log file is compared with the last used exclusion IP address and/or exclusion IP address around the last used exclusion IP addresses. Because the web log file is sorted based on IP addresses, the IP addresses that need to be excluded or discounted from the web log file are grouped together. By comparing the sorted IP address from the sorted web log file with the last used exclusion IP address, the IP addresses to be excluded or discounted are eliminated quickly, especially when a number of the same IP addresses to be excluded or discounted are grouped together. In this case, only one comparison is necessary. In this case, the metrics computed for each algorithm will also take into account of the fact that the web log file is an IP address sorted web log file. After the sorted web log file is filtered, care must be taken to sort the web log file back based on date and time, especially if the web log file needs to be in a time based sorted order for the reporting analysis to work properly. Depending on what information is required from the reporting analysis, such sorting may not be necessary. For example, the information required may not be related to time, but merely usage.

Many advantages are intrinsic to the present invention for web accesses filtering. For example, the present invention utilizes a set of more efficient algorithms. More importantly, the present invention selects a comparison algorithm from a set of algorithms dynamically in order to maximize performance. The present invention reconfigures itself before or when filtering web accesses in order to obtain optimal performance. This adaptability allows the most efficient algorithm and data structure for a given list of exclusion web accesses to be selected. This allows traffic and behavior reports to be generated with more accuracy and in a timely manner. The reports measure the performance of a client site or a client server, and they are essential element of web site analysis. The large number of web accesses that are logged requires expedient process for filtering so that timely reports can be provided. The present invention combines more efficient algorithms with performance evaluation techniques to provide an intelligent, high performance solution.

While the foregoing description refers to particular embodiments of the present invention, it will be understood that the particular embodiments have been presented for purposes of illustration and description. They are not intended to be exhaustive or to limit the invention to the precise forms disclosed. Many modifications and variations are possible in light of the above teachings and may be made without departing from the spirit thereof. The accompanying claims are intended to cover such modifications as would fall within the true scope and spirit of the present invention. The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A method for filtering web accesses, the method comprising:

providing a web log file having a plurality of entries, each entry containing a field identifying a web access of a visitor;

providing a list of exclusion web accesses to be filtered from the web log file;

selecting an optimum algorithm for searching in the list of exclusion web accesses from a set of algorithms;

building a data structure corresponding to the selected algorithm using exclusion web accesses in the list of exclusion web accesses; and filtering the web log file using the data structure corresponding to the selected algorithm, wherein comparisons are made between the web access of each entry of the web log file and the data structure.

2. The method of claim 1, wherein the selection of the optimum algorithm includes exploring the effectiveness of each algorithm in the set of algorithms and data structure with respect to the list of exclusion web accesses and choosing the optimal algorithm from the set of algorithms based on the effectiveness.

3. The method of claim 2, wherein metrics are generated for each algorithm in the set of algorithms to calculate the effectiveness of the algorithm, and performance data of previous analysis runs is used to determine which algorithm is the optimum algorithm.

4. The method of claim 1, wherein the set of algorithms include a binary search algorithm, and a data structure corresponding to a selected binary search algorithm is a sorted list of exclusion web accesses.

5. The method of claim 1, wherein the set of algorithms include a multi-level dynamic table indexing algorithm, and the data structure corresponding to a selected multi-level dynamic table indexing algorithm is a multi-level table.

6. The method of claim 1, wherein the web access contains an IP address, and the list of exclusion web accesses are a list of exclusion IP addresses.

7. The method of claim 1, further comprising:

receiving a filtered web log file; and analyzing the web log file for obtaining at least one of a traffic report and a visitor behavior report.

8. The method of claim 1, further comprising extracting other information associated with web accesses in entries of the web log file with non-filtered web accesses during the filtering.

9. The method of claim 1, further comprising:

sorting the web log file based on the web access field before filtering; and using a last used exclusion web accesses first in a comparison between each entry of the web log file and the data structure subsequent to a comparison that results in an entry being filtered from the web log file.

10. A web accesses filtering system, comprising:

a communication medium;

a client server that interacts with a visitor via the communication medium and provides a log file documenting access information pertaining to the visitor, the log file including a plurality of entries, each entry containing a field identifying a web access of the visitor; and a service server that receives the log file from the client server and filters the log file, wherein the service server is provided with a list of exclusion web accesses to be filtered from the log file, the service server selecting an optimum algorithm for searching in the list of exclusion web accesses from a set of algorithms, building a data structure corresponding to the selected algorithm using exclusion web accesses in the list of exclusion web accesses, and filtering the log file using the data structure corresponding to the selected algorithm, with comparisons being made between the web access of each entry of the log file and the data structure.

11. The system of claim 10, wherein the selection of the optimum algorithm includes exploring the effectiveness of each algorithm in the set of algorithms and data structure with respect to the list of exclusion web accesses and choosing the optimal algorithm from the set of algorithms based on the effectiveness.

12. The system of claim 11, wherein metrics are generated for each algorithm in the set of algorithms to calculate the effectiveness of the algorithm, and performance data of previous analysis runs is used to determine which algorithm is the optimum algorithm.

13. The system of claim 10, wherein the set of algorithms include a binary search algorithm, and a data structure corresponding to a selected binary search algorithm is a sorted list of exclusion web accesses.

14. The system of claim 10, wherein the set of algorithms include a multi-level dynamic table indexing algorithm, and the data structure corresponding to a selected multi-level dynamic table indexing algorithm is a multi-level table.

15. A computer readable medium for use in conjunction with at least one of a web access filtering system and a service server system, the computer readable medium including computer readable instructions encoded thereon which when executed cause the at least one of the web access filtering system and the service server system to:

provide a web log file having a plurality of entries, each entry containing a field identifying a web access of a visitor;

provide a list of exclusion web accesses to be filtered from the web log file;

select an optimum algorithm for searching in the list of exclusion web accesses from a set of algorithms;

build a data structure corresponding to the selected algorithm using exclusion web accesses in the list of exclusion web accesses; and filter the web log file using the data structure corresponding to the selected algorithm, wherein comparisons are made between the web access of each entry of the web log file and the data structure.

16. The computer readable medium of claim 15, wherein the selection of the optimum algorithm includes exploring the effectiveness of each algorithm in the set of algorithms and data structure with respect to the list of exclusion web accesses and choosing the optimal algorithm from the set of algorithms based on the effectiveness.

17. The computer readable medium of claim 16, wherein metrics are generated for each algorithm in the set of algorithms to calculate the effectiveness of the algorithm, and performance data of previous analysis runs is used to determine which algorithm is the optimum algorithm.

18. The computer readable medium of claim 15, wherein the set of algorithms include a binary search algorithm, and a data structure corresponding to a selected binary search algorithm is a sorted list of exclusion web accesses.

19. The computer readable medium of claim 15, wherein the set of algorithms include a multi-level dynamic table indexing algorithm, and the data structure corresponding to a selected multi-level dynamic table indexing algorithm is a multi-level table.

20. The computer readable medium of claim 15, wherein the web access contains an IP address, and the list of exclusion web accesses are a list of exclusion IP addresses.

21. The computer readable medium of claim 15, further comprising computer readable instruction encoded thereon to:

receive a filtered web log file; and analyze the web log file for obtaining at least one of a traffic report and a visitor behavior report.

22. The computer readable medium of claim 15, further comprising computer readable instruction encoded thereon for extracting other information associated with web accesses in entries of the web log file with non-filtered web accesses during the filtering.

23. The computer readable medium of claim 15, further comprising computer readable instruction encoded thereon to:

sort the web log file based on the web access field before filtering; and use a last used exclusion web accesses first in a comparison between each entry of the web log file and the data structure subsequent to a comparison that results in an entry being filtered from the web log file.

* * * * *